Feb. 19, 1935.  W. A. OKENFUSS  1,991,622
END PLATE FOR ELECTRIC MOTORS OR THE LIKE
Filed Sept. 15, 1933
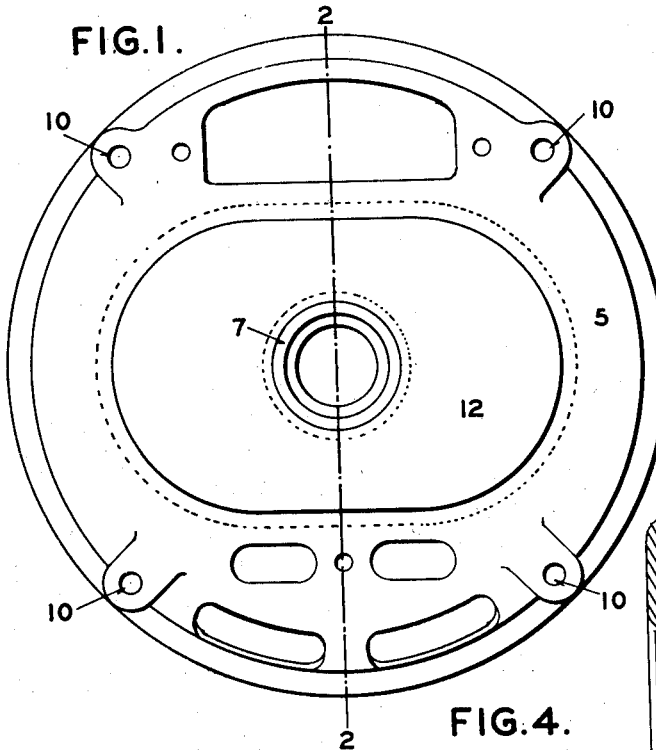
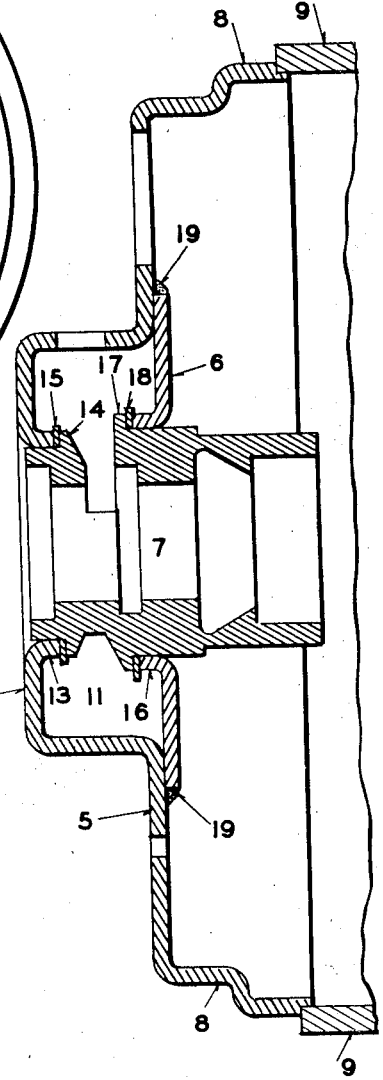
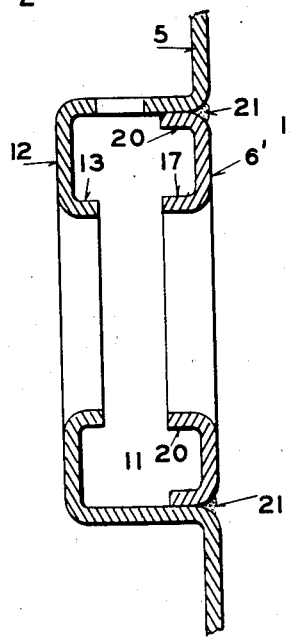
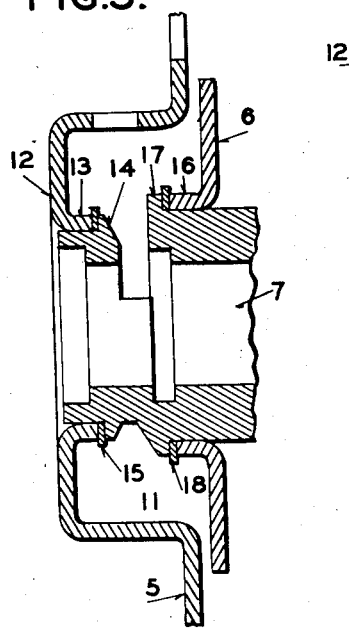
Inventor
W. A. Okenfuss
By
Att'y.

Patented Feb. 19, 1935

1,991,622

UNITED STATES PATENT OFFICE 1,991,622

END PLATE FOR ELECTRIC MOTORS OR THE LIKE

Wilfred A. Okenfuss, St. Louis, Mo., assignor to Wagner Electric Corporation, St. Louis, Mo., a corporation of Delaware Application September 15, 1933, Serial No. 689,525

1 Claim. (Cl. 308—245)

Heretofore electric motors and similar dynamo electric machines have usually been provided with end plates of cast metal. The object of the present invention is to produce an end plate which is composed principally of pressed steel parts.

In this manner I reduce the cost of the end plate, as sheet metal is not only less expensive than an equal weight of cast metal, but a less amount of metal is required to provide the necessary strength in the machine.

A further advantage of my form of end plate is that it is less liable to loss by breakage in handling or cracks resultant from the process of manufacture. The cost of finishing the end plate is also reduced as the sheet metal provides a smooth surface which does not require grinding as in the case of castings.

In the accompanying drawing, which illustrates an end plate made in accordance with my invention, Figure 1 is an end view; Figure 2 is a section, on an enlarged scale, taken on the line 2—2 of Figure 1; Figure 3 is a sectional view showing the method of assembling the parts; and Figure 4 is a sectional view showing a slight modification.

The end plate comprises a main part or shell 5, a division plate 6, and bushing 7. The shell is provided with an inwardly extending flange 8 which engages with the motor frame 9. The shell may be held in position on the frame by means of bolts (not shown) passing through holes 10 in the shell in the usual manner. The central part of the shell is offset outwardly to form an oil chamber 11 surrounding the outer end of the bushing 7. The front wall 12 of the oil chamber is provided with an opening for the reception of the outer end of the bushing and the opening is surrounded by an inwardly extending flange 13 cooperating with a shoulder 14 on the bushing 7. A gasket 15 is placed between the end of the flange and the shoulder to form an oil-tight joint. This gasket is preferably made of copper. The oil chamber is closed by the division plate 6 which is provided with a central opening for the bushing surrounded by an outwardly extending flange 16 cooperating with a shoulder 17 on the bushing. Between this flange and shoulder is a gasket 18 which, like the gasket 15, is preferably of copper.

The shoulders 14 and 17 are so spaced with relation to the dimensions of the other parts that a space will be formed between the body of the shell 5 and the outer edge of the division plate 6, as shown in Figure 3. The outer edge of the division plate is now clamped against the inner face of the shell and welded to form a joint 19. This method of attaching the plate and shell together slightly deforms or distorts the plate and the tension resulting from the elasticity of the plate insures a firm pressure of the flanges and shoulders against the interposed sealing gaskets.

In Figure 4 I have shown a modification in which the division plate 6 is replaced by a division plate 6' which differs from the first named plate in being provided at its outer edge with a flange 20 fitting snugly within the chamber 11, which flange is secured to the chamber wall by a welded joint 21. When this modified form of construction is used, the same result may be secured as in the forms shown in Figures 2 and 3 by forcing the periphery of the plate into the chamber far enough to produce a slight distortion of the disc before the joint 21 is welded so as to obtain the desired pressure against the sealing gaskets.

While I have referred to the joints 19 and 21 as welded, I wish it to be understood that this term includes brazing, soldering, or other equivalent operations.

Having fully described my invention, what I claim as new and desire to secure by Letters Patent of the United States is:

An end plate of pressed metal for motors or the like comprising a shell and a division plate, said shell being provided with an offset, said offset having an opening surrounded by an inwardly projecting flange, said division plate having an opening surrounded by an outwardly projecting flange and having a web extending beyond the offset in the shell and forming therewith an oil chamber, a bushing extending through the oil chamber and provided with a pair of shoulders cooperating with said flanges, the distance between said shoulders being such as to hold the web of the division plate out of contact with the shell when the parts are in their normal form, and means for securing the parts together after the web has been sprung into contact with the shell, whereby the flanges are resiliently urged toward the shoulders.

WILFRED A. OKENFUSS.